W. A. C. OAKS.
Apple-Parers.
No. 141,070. Patented July 22, 1873.
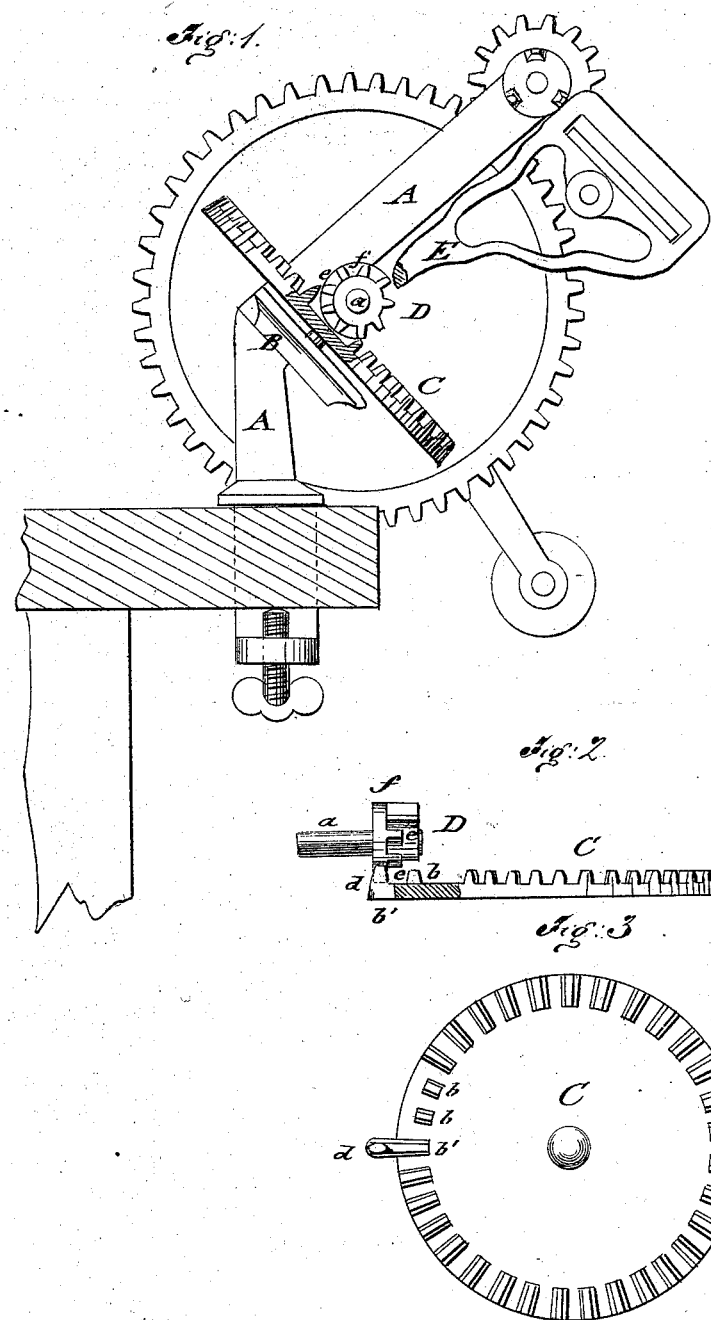
Witnesses:
Inventor:

UNITED STATES PATENT OFFICE.

WILLIAM A. C. OAKS, OF READING, PENNSYLVANIA.

IMPROVEMENT IN APPLE-PARERS.

Specification forming part of Letters Patent No. 141,070, dated July 22, 1873; application filed June 6, 1873.

*To all whom it may concern:*

Be it known that I, WILLIAM A. C. OAKS, of Reading, in the county of Berks and State of Pennsylvania, have invented a new and useful Improvement in Apple-Parer, of which the following is a specification:

In the accompanying drawing, Figure 1 represents a side view of my apple-parer, with parts broken away to show the improved pinion and bevel-gear wheel; Fig. 2, a side view of pinion and gear-wheel; and Fig. 3, a top view of gear-wheel.

Similar letters of reference indicate corresponding parts.

My invention has for its object to so improve the apple-parers in general use, and especially the one patented to me under date of December 10, 1872, and No. 133,796, that the knife will make a positive stop until the apple has made one revolution, so that that part of the apple near the prongs of the fork is fully pared before the knife commences to start around the apple. It will then start around the apple and pare the same completely, in the usual manner. Considerable time is thereby saved, and the working of these parers perfected. My invention consists in providing the gear-wheel of the knife-arm, at that point at which the knife takes its position for paring the apple, with two or more recessed cogs and a projecting tooth and lug-extension, in connection with the pinion-wheel of the crank-shaft, having also part of the teeth cut off and provided with a circular flange, so that thereby a full stop of the paring-knife is obtained while the fork is revolving once with the apple.

In the drawing, A represents the standard or frame, on the projecting arm B of which is turning, in suitable bearing, the gear-wheel C, into which meshes the pinion D of the crank-shaft $a$. The upwardly-projecting arm E, which carries the paring-knife, is pivoted to gear-wheel C, and revolves with it, paring the apple, and passing then, by means of coiled spring and guide-flange, below the fork-shaft, to the point from which it started, as appears more fully in my patent of December 10, 1872. An unpared apple is then placed on the fork, and the knife moves forward around the apple as the same revolves. The part near the prongs of the fork is thereby very incompletely pared.

For the purpose of avoiding this defect of my parer, I cut off two or more of the cogs $b$ of gear-wheel C at the starting-point for paring, and extend the next adjoining tooth $b'$ beyond the circumference of wheel C, providing it with an upward-projecting lug, $d$. The pinion-wheel D is, in a similar manner, provided with recessed teeth $e$ around three-quarters of its circumference, and connected at the rear side with a circular flange, $f$, along these teeth $e$. The lug $d$ of tooth $b'$ glides over the flanges $f'$, and the recessed teeth $b$ of the gear-wheel C pass by the recessed teeth $e$ of the pinion D, so that the revolving motion of the latter continues, while that of the gear-wheel C is stopped till lug $d$ clears the flange $f$ and allows the uncut teeth of the pinion D to gear over tooth $b'$ and the other cogs of wheel C.

The number of recessed teeth of the pinion D is proportioned in such a manner that a full revolution of the fork-shaft is obtained before the unrecessed teeth engage the teeth of the gear-wheel; the knife thereby pares clean around the prongs of the fork, and starts then around the apple for full paring.

Having thus described my invention, I claim as new and desire to secure by Letters Patent—

In apple-parers, the combination of the flanged pinion D, with recessed teeth $e$, with the gear-wheel C, having also recessed and extended teeth, arranged in such a manner that the pinion rotates and produces a full revolution of the fork-shaft while the gear-wheel remains at rest, substantially as and for the purpose described.

W. A. C. OAKS.

Witnesses:
J. ROSS MILLER,
SOLON C. KEMON.